Nov. 11, 1924.

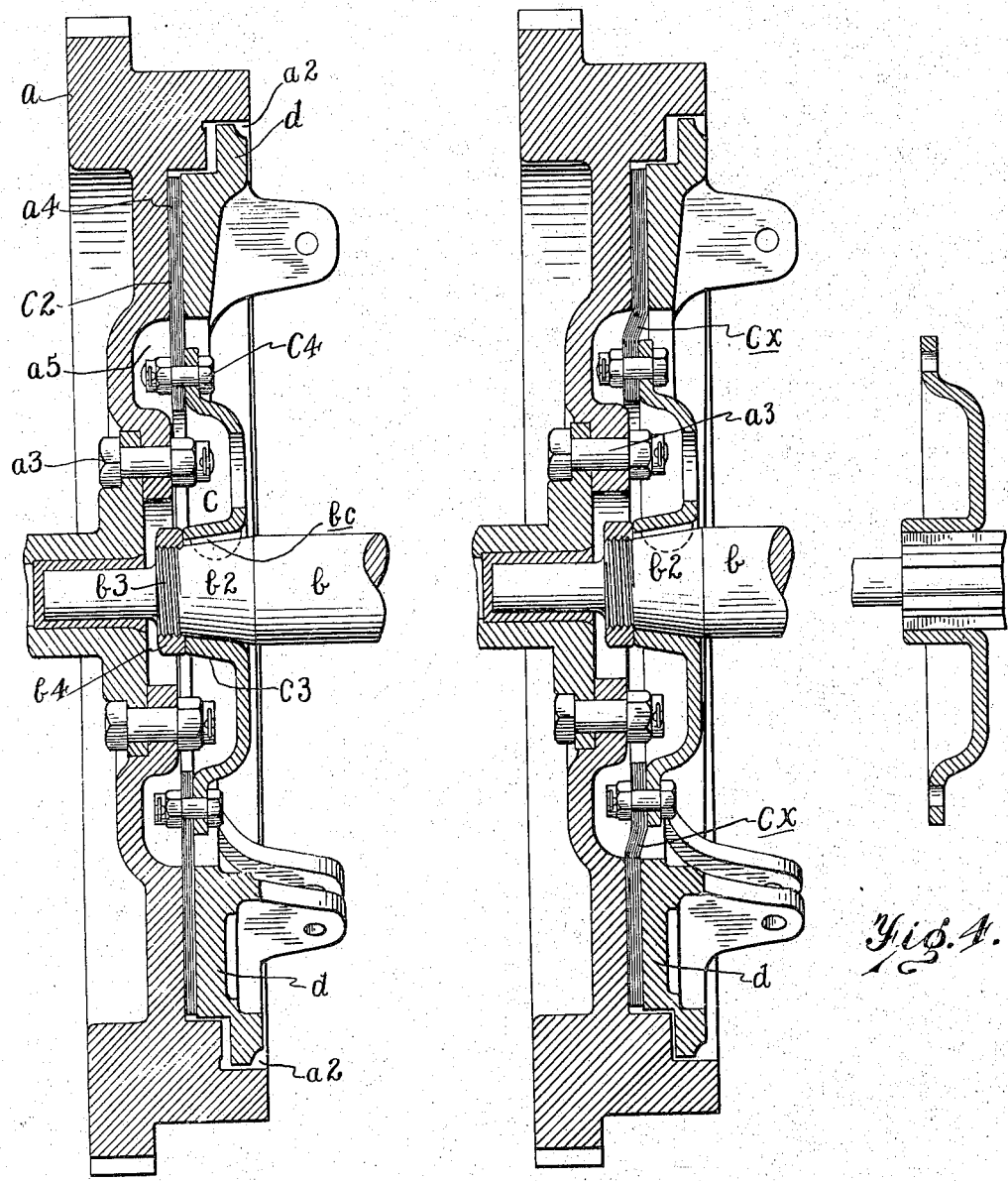

R. STAHL

CLUTCH 1,515,284

Filed Aug. 14, 1922    2 Sheets-Sheet 2

Inventor
Rodolphe Stahl.

By Ralzemond A. Parker

Attorney

Patented Nov. 11, 1924.

1,515,284

UNITED STATES PATENT OFFICE.

RODOLPHE STAHL, OF DETROIT, MICHIGAN.

CLUTCH.

Application filed August 14, 1922. Serial No. 581,627.

*To all whom it may concern:*

Be it known that I, RODOLPHE STAHL, a citizen of the United States, residing at Detroit, county of Wayne, State of Michigan, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

My invention relates to clutches for automobiles and objects of my improvements are to secure lightness, cheapness and convenience of assembly.

In automobile clutches it is desirable to reduce the moment of inertia of the part to which the power is transmitted as much as possible, and I secure this result by my invention in an especial degree.

In the accompanying drawings,—

Figure 1 is a section of an apparatus embodying my invention, the actuating mechanism being omitted.

Fig. 2 is a view similar to Fig. 1 illustrating the action of the apparatus when the parts are not accurately in alignment.

Fig. 4 is a detail sectional view showing a modified construction.

Figure 3:
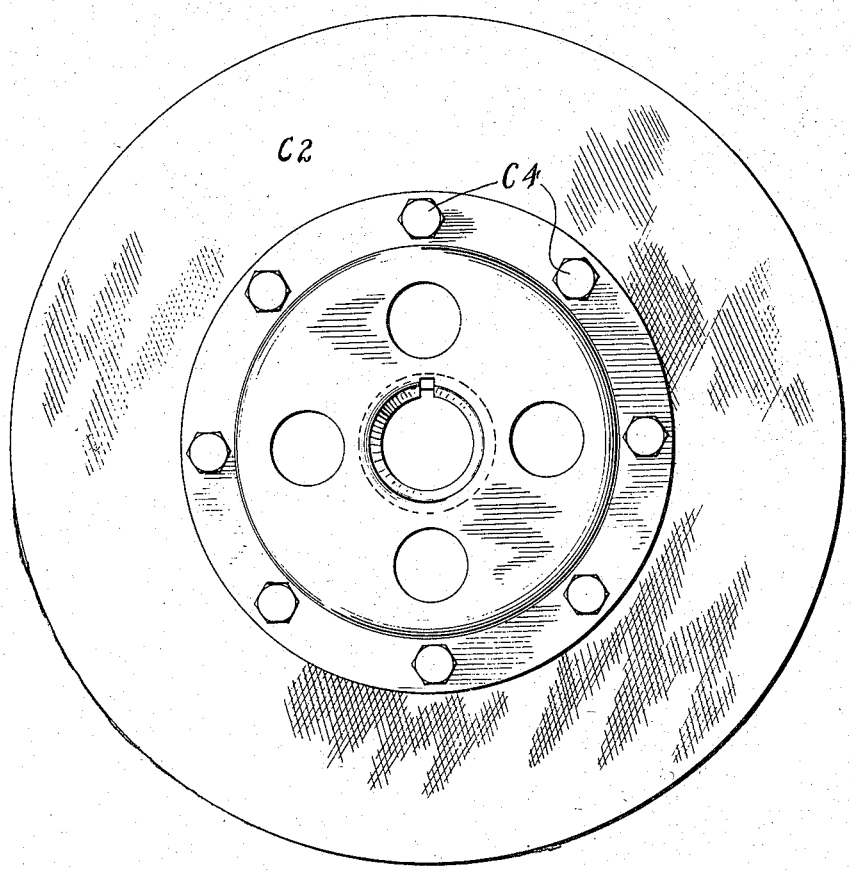
Fig. 3 is a plan view showing the connecting disk.

$a$ is a fly wheel of an automobile engine. This is hollowed out as shown at $a^2$ on the side opposite the engine and toward the transmission gear casing. $a^3$ indicates the assembling bolts of the fly wheel. $b$ is the shaft which conveys the power from the engine to the transmission gearing and shaft. One end of the shaft $b$ extends into the cavity of the fly wheel $a$ and is turned to a smooth and conical form, as indicated at $b^2$, and is further provided with a screw-threaded portion $b^3$ adjacent to the outer and smaller end of the conical portion $b^2$.

$c$ is a sheet metal disk pressed out to provide the conical portion $c^3$ adapted to fit and closely engage over the conical portion $b^2$ of the shaft $b$. The outer edge of the disk $c$ is turned inward to form a dished construction to provide clearance room for the assembly bolts $a^3$ of the fly wheel. The outer edge of the disk $c$ is again turned outward approximately in the plane of the fly wheel and the annular friction surface $a^4$ on said wheel. $c^2$ is an annulus of flexible material adapted to be clamped against the friction surface $a^4$ of the fly wheel to bind said annulus to the fly wheel and thereby connect through the disk $c$ the fly wheel and engine to the shaft $b$. The annulus $c^2$ is secured by bolts $c^4$ to the face at the outturned outer edge of the disk $c$. The annulus $c^2$ is usually made up of a plurality of layers of textile material or fabric of that general nature. $bc$ is a key uniting the disk $c$ to the shaft $b$, and $b^4$ is a nut engaging the threads $b^3$ and forcing and holding the disk $c$ firmly in position upon the conical portion $b^2$ of the shaft $b$.

The web of the fly wheel $a$ is provided with a concentric groove $a^5$ to present clearance room for the bolts $c^4$ connecting the ring $c^2$ with the disk $c$.

$d$ is a pressure ring adapted to clamp the flexible ring $c^2$ against the friction ring $a^4$ on the fly wheel $a$ or to permit the free movement of the ring $c^2$ relative to said fly wheel. The actuating apparatus for the pressure ring $b$ may be that shown in the application filed by me on the 14th day of August, 1922, and having the Serial Number 581,626 for an improvement in clutches, or may be of any conventional form.

It will be noted that in case the parts are not assembled with absolute accuracy, as for instance, the shaft $b$ may not be accurately in line with the crankshaft of the engine over the axis of the fly wheel, in such case the flexible ring $c^2$ will be slightly warped as shown at $cx$ in Fig. 2 and no strain or injury to the parts will result from the slight inaccuracy in the construction.

It will be observed that the disk $c$ may be made of thin sheet metal and still be abundantly strong because of the annular flanges formed in producing the conical hub to engage the conical portion $b^2$ of the shaft $b$ and the in-turned outer rim to produce the dished form for allowing clearance of the bolts $a^3$, and the flexible ring $c^2$ will be light and add very little to the small moment of inertia of the disk $c$.

Instead of shaping the engaging central portion of the disc $c$ into a cone, it may have a cylindrical form and be engaged with the shaft $b$ by splines and grooves, as shown in Fig. 4.

What I claim is:

In an apparatus of the kind described, the combination of a driving part, a power transmission shaft, and a stamped sheet metal disk on said shaft adapted to be connected through a clamping action to said driving part, the end of said shaft being formed into a conical portion, said disk being turned inward at its center to form a conical hub adapted to fit over and engage the conical portion of said shaft and means for forcing said disk upon said shaft and securing it in position.

In testimony whereof, I sign this specification.

RODOLPHE STAHL.